US007817579B2

(12) United States Patent
Ramirez, II et al.

(10) Patent No.: US 7,817,579 B2
(45) Date of Patent: Oct. 19, 2010

(54) ACCESS POINT HAVING AT LEAST ONE OR MORE CONFIGURABLE RADIOS

(75) Inventors: Jose' Ramirez, II, Aloha, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1356 days.

(21) Appl. No.: 10/812,648

(22) Filed: Mar. 29, 2004

(65) Prior Publication Data

US 2005/0213516 A1 Sep. 29, 2005

(51) Int. Cl.
*H04W 4/00* (2009.01)
*H04L 12/28* (2006.01)

(52) U.S. Cl. ..................... 370/254; 370/338
(58) Field of Classification Search .................. 370/331, 370/335, 342, 345, 347, 465, 466, 252; 455/522
See application file for complete search history.

(56) References Cited

U.S. PATENT DOCUMENTS

| | | | | |
|---|---|---|---|---|
| 6,088,591 A | * | 7/2000 | Trompower et al. ......... | 455/438 |
| 6,128,490 A | * | 10/2000 | Shaheen et al. ............. | 455/434 |
| 6,167,032 A | * | 12/2000 | Allison et al. ............... | 370/252 |
| 6,188,898 B1 | * | 2/2001 | Phillips ....................... | 455/433 |
| 6,259,898 B1 | * | 7/2001 | Lewis ......................... | 455/103 |
| 6,671,509 B1 | * | 12/2003 | Tanaka et al. ............... | 455/419 |
| 2002/0080728 A1 | * | 6/2002 | Sugar et al. ................. | 370/252 |
| 2002/0090001 A1 | * | 7/2002 | Beckwith .................... | 370/466 |
| 2002/0181559 A1 | * | 12/2002 | Heidari-Bateni et al. .... | 375/148 |
| 2003/0235167 A1 | * | 12/2003 | Kuffner ....................... | 370/335 |
| 2004/0051664 A1 | * | 3/2004 | Frank .......................... | 342/457 |
| 2004/0196812 A1 | * | 10/2004 | Barber ........................ | 370/334 |

* cited by examiner

*Primary Examiner*—Pankaj Kumar
*Assistant Examiner*—Hicham B Foud
(74) *Attorney, Agent, or Firm*—Kacvinsky Daisak, PLLC

(57) ABSTRACT

Briefly, an access point may include one or more software defined radios that may be arranged to implement one or more radio transmission protocols or standards. New radio transmission protocol or standards may be downloaded into the access point so that the access point may communicate according to new radio transmission protocols or standards as they are developed.

16 Claims, 3 Drawing Sheets

ACCESS POINT HAVING AT LEAST ONE OR MORE CONFIGURABLE RADIOS

BACKGROUND OF THE INVENTION

New radio transmission protocols and standards are continually being developed to implement advances in radio communication technologies. However, as new devices are developed using new radio transmission protocols and standards, legacy devices using older standards still may exist and be viable for a predetermined lifetime that may overlap with the lifetime of the new devices. As a result, for example in wireless local area network equipment, there may be several devices in deployment that may communicate using a wide array of non-compatible radio transmission standards resulting in a fragmentation of which devices are able to communicate with other devices.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
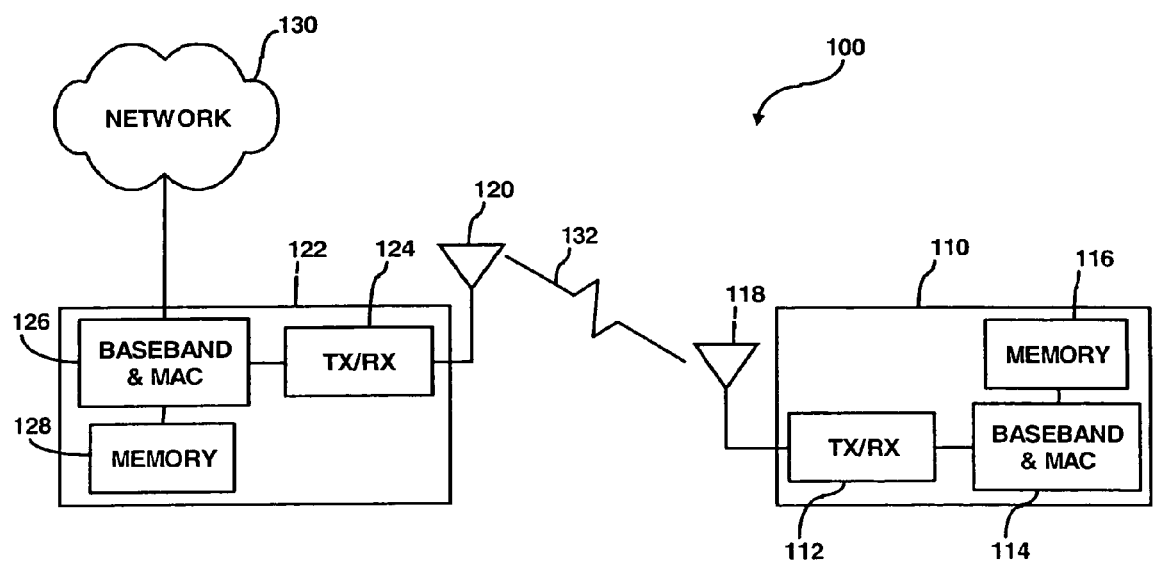
FIG. 1 is a block diagram of wireless local area network in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic, descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120, transceiver 124, processor 126, and memory 128. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Figure 2:
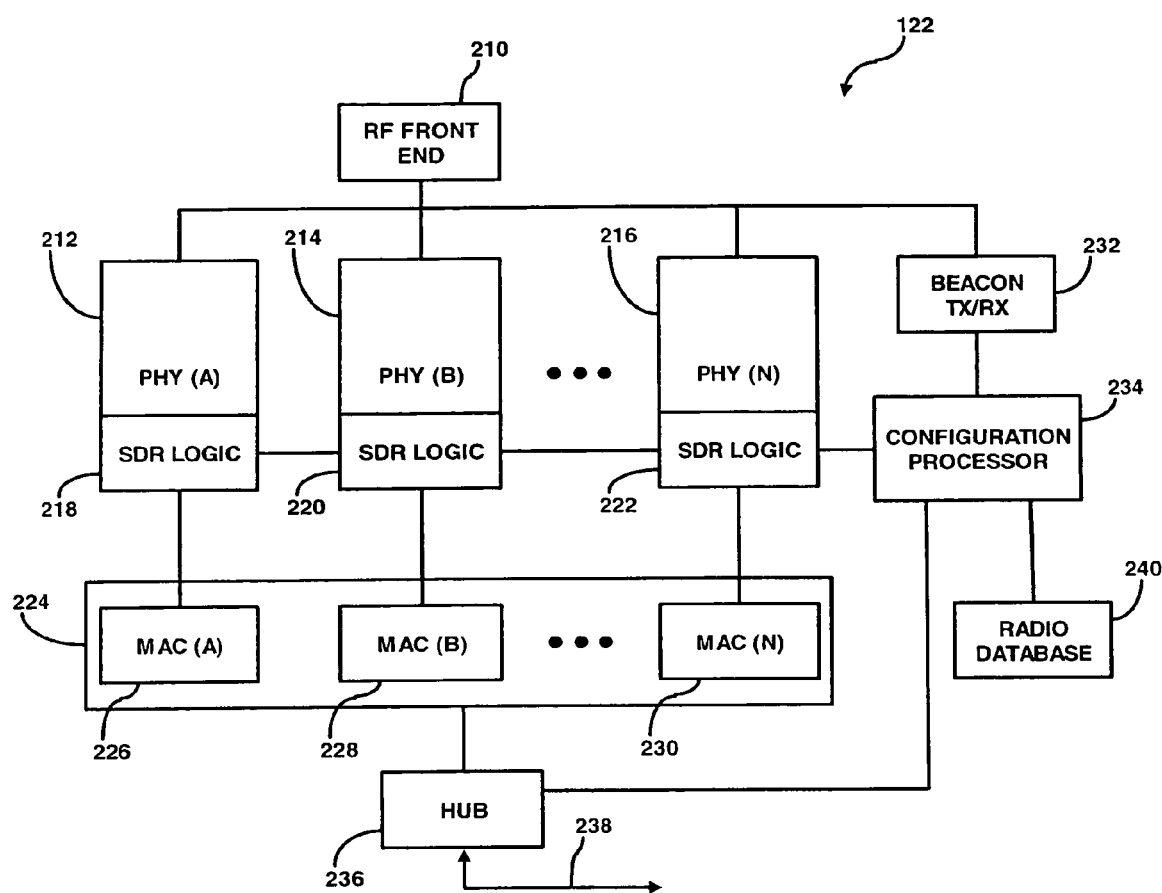
FIG. 2 is a block diagram of an access point having at least one or more configurable radios in accordance with the present invention.

Referring now to FIG. 2, an access point having at least one or more configurable radios in accordance with the present invention will be discussed. In one embodiment, access point 122 may be access point 122 as shown in and described with respect to FIG. 1. Access point 122 may include a radio frequency (RF) front end 210 which may be utilized, for example, to connect one or more transceivers for example as shown in FIG. 2 as N physical layer blocks PHY (A) 212, PHY (B) 214, up to physical layer block PHY (N) 216, and may include for example switches, filters, impedance matchers, and so on, to connect one or more transmitters and receivers to one or more antennas, although the scope of the invention is not limited in this respect. Physical layer blocks 212, 214, and 216 may include software defined radio programmable logic blocks 218, 220, and 222 to configure the function of the physical layer blocks 212, 214, and 216, for example via programming of programmable logic blocks 218, 220, and 222. Communication using physical layer blocks 212, 214, and 216 may be controlled via a media access control (MAC) layer 224 which may include N MAC layer blocks MAC (A) 226, MAC (B), up to MAC layer block MAC (N) 230 to control corresponding physical layer blocks 212, 214, and 216, although the scope of the invention is not limited in this respect. In one embodiment of the invention, radios defined by physical layer blocks 212, 214, and 216, and optionally MAC layer blocks 226, 228, and 230 of MAC layer 224 may be programmable in accordance with at least one or more specifications provided by the Software Defined Radio Forum of Denver, Colo., although the scope of the invention is not limited in this respect. In one embodiment of the invention, radios defined by PHY blocks 212, 214, and 216 may be programmable to implement radio communication in accordance with one or more radio communication standards, for example an IEEE 802.11 standard such as IEEE 802.11a, IEEE 802.11b, IEEE 802.11g, IEEE 802.11n, and so on, a BLUETOOTH® standard, a cellular radio standard such as a Global System for Mobile Communications (GSM) system, an Enhanced Data GSM Environment (EDGE) standard, a Wideband Code Division Multiple Access (WCDMA) standard, an International Telecommunication Union (ITU) standard such as a Third Generation (3G) or a Fourth Generation (4G) mobile communication technology, and so on, although the scope of the invention is not limited in this respect. It should be noted that in at least one or more alternative embodiments of the invention, access point 122 may be other wireless devices, for example a network interface card, a cellular telephone, a cellular base station, or the like, although the scope of the invention is not limited in this respect.

In one embodiment of the invention, PHY blocks 212, 214, and 216 may have corresponding MAC blocks 226, 228, and 230 that may be implemented on a MAC layer integrated circuit. In at least one particular embodiment of the invention, at least a portion of MAC blocks 226 may be implemented at least in part by a processor such as processor 126 of access point 122, and in another embodiment MAC blocks may be implemented entirely in by processor 126 rather than being implemented on a separate integrated circuit, although the scope of the invention is not limited in this respect.

A configuration processor 234 may couple to PHY blocks 212, 214, and 216, and to SDR logic blocks 218, 220, and 222 to configure an arrangement of and to activate PHY blocks 212, 214, and 216. In addition, MAC blocks 226, 228, and 230 may be optionally programmed and activated by configuration processor 234 to select a desired radio operation. In one embodiment of the invention, configuration processor 234 may be a separate processor, and in another embodiment of the invention, configuration processor 234 may be implemented in part or in whole by processor 126 of access point 122, although the scope of the invention is not limited in this respect. A radio database 240 may couple to configuration processor 234 to store a list of radios supported by and able to be implemented by access point 122 and may include configuration information to arrange PHY blocks 212, 214, and 216, SDR logic blocks 218, 220, and 222, and optionally MAC blocks 226, 228, and 230 to implement one or more desired radios, although the scope of the invention is not limited in this respect. In one embodiment of the invention, radio database 240 may be stored in part or in whole in memory 128 of access point 122 although the scope of the invention is not limited in this respect.

Configuration processor 234 may couple to a beacon transceiver 232 to transmit and receive beacons to and from a remote device such as mobile unit 110. In one embodiment of the invention, beacon transceiver 232 may be implemented as a separate transceiver circuit, and alternatively beacon transceiver 232 may be implemented as a transceiver of one or more of PHY blocks 212, 214, and 216, and communicate beacons in accordance with a radio communication standard implemented by one or more of the radios implemented by PHY blocks 212, 214, and 216, although the scope of the invention is not limited in this respect.

Radios defined by PHY blocks 212, 214, and 216, by SDR logic 218, 220, and 222, and by MAC blocks 226, 228, and 230 may be coupled to a hub 236 to couple the radios to an Ethernet backbone 238 so that the radios may communicate with a network such as network 130, although the scope of the invention is not limited in this respect. In one embodiment of the invention, hub 236 may implement a switch or additionally may implement a router to function as gateway between two or more networks, although the scope of the invention is not limited in this respect.

Figure 3:
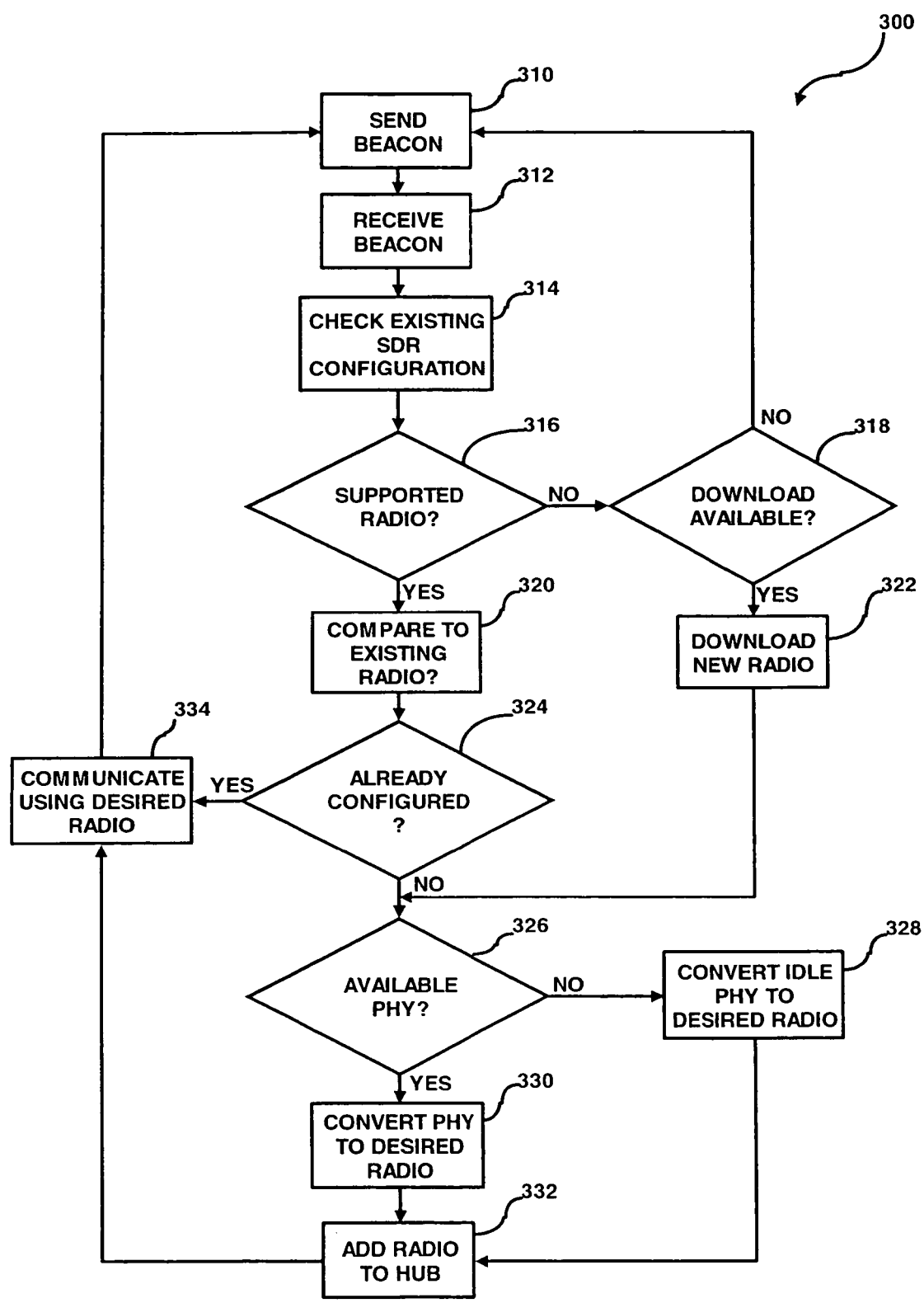
FIG. 3 is a flow chart of an operation of an access point having at least one or more configurable radios in accordance with the present invention.

Referring now to FIG. 3, a flow chart of an operation of an access point having at least one or more configurable radios in accordance with the present invention will be discussed. In one embodiment of the invention, the operation of an access point as implemented by method 300 of FIG. 3 may be executed on a processor of access point 122 such as processor 126 or configuration processor 234 although the scope of the invention is not limited in this respect. Beacon transceiver 232 may transmit one or more beacons at block 310 to a potential remote device such as mobile unit 110. Such a beacon transmission may be transmitted in either a passive mode or in an active mode so that a remote device may receive the beacon and become aware of the presence of access point 122. The remote device such as mobile unit 110 may transmit a beacon reply to indicate a desire to communicate with access point 122 and which access point may receive at block 312. The reply transmitted by the remote device may include a desired communication protocol, communication standard, and working parameters to utilize a desired radio operation. Upon receiving the reply, configuration processor 234 may check at block 314 whether access point 122 has an existing software defined radio configuration for the desired radio by checking radio database 240 whether the desired radio is supported by access point 122. A determination is made at block 316 whether the desired radio is supported.

In the event the desired radio is not supported, a determination may be made at block 318 whether a download is available to download radio parameters to access point 122 so that access point 122 may support the desired radio. For example, configuration processor 234 may connect to a remote server via Ethernet backbone via the Internet or other remote server connected to network 130. In the event no download is available to implement the desired radio, access point may continue to send beacons at block 310. In one embodiment of the invention, access point 122 may transmit a reply to the remote device, either in a beacon or in a separate transmission, that access point 122 does not support the desired radio and that the remote device should communicate using another radio standard or protocol. In a further alternative embodiment, access point 122 may transmit a reply to the remote device indicating which radio protocols or standards that access point 122 supports so that the remote device will know which radio protocol or standard it may use to communicate with access point 122, although the scope of the invention is not limited in this respect.

In the event a download is available to update the types radio protocols or standards that access point 122 may utilize, one or more new radio arrangements may be downloaded at block 322, for example from a remote server connected to access point 122 via network 130 which may be, for example, a remote sever connected to the Internet or a local or wide area network, although the scope of the invention is not limited in this respect.

In the event the desired radio is a radio supported by access point 320, configuration processor 234 may compare at block 320 the desired radio to the radios currently implemented by PHY blocks 212, 214, and 216. A determination may be made at block 324 whether at least one of PHY blocks 212, 214, and 216 is already configured to operate according to the desired radio protocol or standard, and if so, access point 122 may communicate with the remote device at block 334 using the desired radio. In the event at least one of PHY blocks 212, 214, and 216 is not already configured to operate according to the desired radio protocol or standard, or in the event that a new radio configuration was recently downloaded at block 322, a determination may be made at block 326 whether there is a PHY block that is available to be configured as the desired radio. If so, configuration processor 234 may convert at least one of PHY blocks 212, 214, and 216 and SDR logic 218, 220, and 222, and optionally at least one of a corresponding MAC block 226, 228, or 230 to be arranged to operated according to the desired radio protocol or standard, and the radio may be added to hub 332. If needed, an idle or infrequently utilized one or PHY blocks 212, 214, and 216 may be converted to the desired radio protocol or standard at block 328, and added to hub at block 332. Access point 122 may then communicate with the remote device at block 334 using the desired radio.

Although the invention has been described with a certain degree of particularity, it should be recognized that elements thereof may be altered by persons skilled in the art without departing from the spirit and scope of the invention. It is believed that the access point having at least one or more configurable radios of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:

A wireless access point having a radio comprising two or more physical layer blocks;

a configuration processor to arrange the two or more physical layer blocks to communicate according to one of at least two or more radio communication protocols or standards, the configuration processor to determine the availability of the two or more physical layer blocks prior to the arrangement of a particular physical block to a desired communication protocol, and when there is not an available physical layer block, reprogramming an idle one of the two or more physical layer blocks or one of the two or more physical layer blocks that is used less frequently than another of the two or more physical layer blocks to operate according to the desired communication protocol or standard; and a beacon transceiver to transmit a beacon to a remote device and to receive a reply from the remote device, wherein a beacon transmitted by said beacon transceiver provides an indication of the one or more available radio communication protocols and a received reply from the remote device provides an indication of a desired radio communication protocol.

2. An apparatus as claimed in claim 1, said two or more physical layer blocks including software defined radio logic block being programmable to cause the two or more physical layer blocks to be reprogrammed to communicate according to at least one or more radio communication protocols.

3. An apparatus as claimed in claim 1, further comprising a memory having a database stored thereon, the database including information to configure the two or more physical layer blocks to communicate according to one of the at least two or more radio communication protocols.

4. An apparatus as claimed in claim 1, further comprising a hub, and said radio including at least one or more media access control blocks to couple to a network through said hub.

5. A method, comprising:
transmitting a beacon from a wireless access point to a remote device, the beacon indicating one or more available radio communication protocols;
receiving from the remote device a reply to the transmitted beacon at the wireless access point, the reply indicating a desired radio communication protocol;
determining whether the desired radio communication protocol is supported by the wireless access point; and
in the event the desired radio communication protocol is supported, determining whether there is an available physical layer block, and when there is an available physical layer block, programming the physical layer block to communicate according to the desired radio communication protocol, and when a physical layer block is not available, reprogramming an idle physical layer block or one of two or more physical layer blocks that is used less frequently than another of the two or more physical layer blocks to operate according to the desired radio communication protocol.

6. A method as claimed in claim 5, further comprising, when the desired communication protocol is not supported, determining whether a download of the desired radio communication protocol is available, and when available, downloading the desired radio communication protocol and programming the radio to communicate according to the desired radio communication protocol.

7. A method as claimed in claim 5, further comprising determining whether a physical layer block is currently programmed to operate according to the desired radio communication protocol, and when so, communicating with the remote device according to the desired radio protocol, and when not currently programmed, then programming at least one physical layer block to operate according to the desired radio communication protocol and then communicating with the remote device according to the desired radio communication protocol.

8. A method as claimed in claim 5, further comprising programming two or more physical layer blocks to communicate according to two or more radio communication protocols, and coupling the physical layer blocks to a network through a hub.

9. An article comprising a storage medium having stored thereon instructions that, when executed by a computer, result in arranging an access point to operate using a desired radio communication protocol by:
transmitting a beacon from a wireless access point to a remote device, the beacon indicating one or more available radio communication protocols;
receiving from the remote device a reply to the transmitted beacon at the wireless access point, the reply indicating a desired radio communication protocol;
determining whether the desired radio communication protocol is supported by the wireless access point; and
in the event the desired radio communication protocol is supported, determining whether there is an available physical layer block, and when there is an available physical layer block, programming the physical layer block to communicate according to the desired radio communication protocol, and when a physical layer block is not available, reprogramming an idle physical layer block or one of two or more physical layer blocks that is used less frequently than another of the two or more physical layer blocks to operate according to the desired radio communication protocol.

10. An article as claimed in claim 9, wherein the instructions, when executed, further result in arranging the access point to operate using a desired radio communication protocol by, when the desired communication protocol is not supported, determining whether a download of the desired radio communication protocol is available, and when available, downloading the desired radio communication protocol and programming the radio to communicate according to the desired radio communication protocol.

11. An article as claimed in claim 9, wherein the instructions, when executed, further result in arranging the access point to operate using a desired radio communication protocol by determining whether a physical layer block is currently programmed to operate according to the desired radio communication protocol, and when so, communicating with the remote device according to the desired radio protocol, and when not currently programmed, then programming at least one physical layer block to operate according to the desired radio communication protocol and then communicating with the remote device according to the desired radio communication protocol.

12. An article as claimed in claim 9, wherein the instructions, when executed, further result in arranging the access point to operate using a desired radio communication protocol by, further comprising programming two or more physical layer blocks to communicate according to two or more radio communication protocols, and coupling the physical layer blocks to a network through a hub.

13. An apparatus, comprising:
A wireless access point including a network interface circuit having a radio comprising two or more physical layer blocks;
an omnidirectional antenna to couple to said radio;
a processor to arrange the physical layer block to communicate according to one of at least two or more radio communication protocols, wherein said two or more physical layer blocks have a media access layer block being implemented at least in part by said processor, the processor to determine the availability of the two or more physical layer blocks prior to the arrangement of a particular physical block to a desired communication protocol, and when there is not an available physical layer block, reprogramming an idle one of the two or more physical layer blocks or one of the two or more physical layer blocks that is used less frequently than another of the two or more physical layer blocks to operate according to the desired communication protocol; and a beacon transceiver to transmit a beacon to a remote device and to receive a reply from the remote device, wherein a beacon transmitted by said beacon transceiver provides an indication of the one or more available radio communication protocols and a received reply from the remote device provides an indication of a desired radio communication protocol.

14. An apparatus as claimed in claim 13, said physical layer block including software defined radio logic block being programmable to cause the physical layer block to be reprogrammed to communicate according to at least one or two or more radio communication protocols.

15. An apparatus as claimed in claim 13, further comprising a memory having a database stored thereon, the database including information to configure the physical layer block to communicate according to one of the at least two or more radio communication protocols.

16. An apparatus as claimed in claim 13, further comprising a hub, and said radio including at least two or more physical layer blocks and at least one or more media access control blocks to couple to a network through said hub.

* * * * *

UNITED STATES PATENT AND TRADEMARK OFFICE
CERTIFICATE OF CORRECTION

| | | |
|---|---|---|
| PATENT NO. | : 7,817,579 B2 | Page 1 of 1 |
| APPLICATION NO. | : 10/812648 | |
| DATED | : October 19, 2010 | |
| INVENTOR(S) | : Jose ' Ramirez, II et al. | |

It is certified that error appears in the above-identified patent and that said Letters Patent is hereby corrected as shown below:

In column 6, line 63, in claim 1, delete "A" insert -- a --, therefor.

In column 8, line 58, in claim 13, delete "A" insert -- a --, therefor.

Signed and Sealed this
Fifteenth Day of February, 2011

David J. Kappos
*Director of the United States Patent and Trademark Office*